(12) United States Patent
Habert et al.

(10) Patent No.: US 10,731,029 B2
(45) Date of Patent: Aug. 4, 2020

(54) POLYOLEFIN COMPOSITIONS WITH IMPROVED MECHANICAL AND BARRIER PROPERTIES

(71) Applicants: Braskem S.A., Camaçari (BR); Universidade Federal do Rio de Janeiro, Rio de Janeiro (BR)

(72) Inventors: Alberto Cláudio Habert, Rio de Janeiro (BR); Cristiano Piacsek Borges, Rio de Janeiro (BR); Cristina Cardoso Pereira, Rio de Janeiro (BR); Maria Elizabeth Ferreira Garcia, Rio de Janeiro (BR); Jane Hitomi Fujiyama-Novak, Rio de Janeiro (BR); Rafael Aislan Amaral, Rio de Janeiro (BR); Bárbara Iria Silva Mano, São Paulo (BR); Vinicius Galhard Grassi, São Paulo (BR); Rogério Massanori Sakahara, São Paulo (BR); Marcelo Farah, São Paulo (BR); Mariele Kaipers Stocker, São Paulo (BR); Marcos Roberto Paulino Bueno, São Paulo (BR)

(73) Assignees: Braskem S.A., Camaçari (BR); Universidade Federal do Rio de Janeiro, Rio de Janeiro (BR)

( * ) Notice: Subject to any disclaimer, the term of this patent is extended or adjusted under 35 U.S.C. 154(b) by 0 days.

(21) Appl. No.: 15/282,169

(22) Filed: Sep. 30, 2016

(65) Prior Publication Data

US 2017/0096552 A1    Apr. 6, 2017

Related U.S. Application Data

(60) Provisional application No. 62/236,042, filed on Oct. 1, 2015.

(51) Int. Cl.
| | |
|---|---|
| C08L 23/06 | (2006.01) |
| C08L 23/08 | (2006.01) |
| C08L 29/00 | (2006.01) |
| C08L 51/06 | (2006.01) |
| C08J 3/00 | (2006.01) |
| C08J 3/24 | (2006.01) |

(52) U.S. Cl.
CPC ............... *C08L 23/06* (2013.01); *C08J 3/005* (2013.01); *C08J 3/24* (2013.01); *C08L 23/0815* (2013.01); *C08L 29/00* (2013.01); *C08L 51/06* (2013.01); *C08J 2323/06* (2013.01); *C08J 2329/04* (2013.01); *C08J 2429/04* (2013.01); *C08L 2201/08* (2013.01); *C08L 2205/03* (2013.01); *C08L 2205/22* (2013.01)

(58) Field of Classification Search
CPC ...... C08L 23/06; C08L 23/08; C08L 23/0807; C08L 23/0815; C08L 23/0823; C08L 29/04; C08L 31/04; C08L 23/0876; C08L 2205/22
See application file for complete search history.

(56) References Cited

U.S. PATENT DOCUMENTS

| | | | | |
|---|---|---|---|---|
| 5,198,497 | A | * | 3/1993 | Mathur ................... C08L 23/08 523/437 |
| 5,247,019 | A | | 9/1993 | Cozens et al. |
| 5,369,168 | A | | 11/1994 | Famili et al. |
| 6,423,760 | B1 | * | 7/2002 | Qiao ......................... C08J 3/26 428/402 |
| 7,157,516 | B2 | | 1/2007 | Chaiko |
| 2004/0062888 | A1 | | 4/2004 | Cruz |
| 2009/0018248 | A1 | * | 1/2009 | Pirri ......................... C08K 9/08 524/425 |
| 2011/0152408 | A1 | * | 6/2011 | Cunningham .......... C08L 51/06 523/437 |
| 2011/0195259 | A1 | | 8/2011 | Song |
| 2012/0238682 | A1 | | 9/2012 | Yang et al. |

FOREIGN PATENT DOCUMENTS

| | | |
|---|---|---|
| CN | 103242612 A | 8/2013 |
| WO | 9313167 A1 | 7/1993 |
| WO | 02/36708 A1 | 5/2002 |

OTHER PUBLICATIONS

Office Action issued in corresponding Chilean Patent Application No. 201800810; dated Apr. 8, 2019 (11 pages).
International Seach Report dated Jan. 10, 2020, issued in related International Patent Application No. PCT/IB2019/026290 (5 pages).
Witten Opinion dated Jan. 10, 2020, issued in related International Patent Application No. PCT/IB2019/026290 (5 pages).
Office Action dated Jan. 7, 2020, issued in related European Patent Application No. 16787322.3 (4 pages).

* cited by examiner

*Primary Examiner* — Jeffrey C Mullis
(74) *Attorney, Agent, or Firm* — Osha Liang LLP

(57) ABSTRACT

Polymer compositions may include a polymer matrix containing a polyolefin, one or more polymer particles dispersed in the polymer matrix, wherein the one or more polymer particles include a polar polymer selectively crosslinked with a crosslinking agent, and wherein the one or more polymer particles has an average particle size of up to 200 μm. Processes of preparing a polymer composition may include mixing a polyolefin, a polar polymer, and a crosslinking agent; and selectively crosslinking the polar polymer with the crosslinking agent in the presence of the polyolefin. Methods may include increasing stress cracking resistance of a polyolefin by mixing a polar polymer with the polyolefin; and selectively crosslinking the polar polymer in the presence of the polyolefin with a crosslinking agent to form crosslinked polar polymer particles dispersed in the polyolefin.

14 Claims, 9 Drawing Sheets

POLYOLEFIN COMPOSITIONS WITH IMPROVED MECHANICAL AND BARRIER PROPERTIES

BACKGROUND

Polyolefins such as polyethylene (PE) and polypropylene (PP) may be used to manufacture a varied range of articles, including films, molded products, foams, and the like. Polyolefins may have characteristics such as high processability, low production cost, flexibility, low density and recycling possibility. However, physical and chemical properties of polyolefin compositions may exhibit varied responses depending on a number of factors such as molecular weight, distribution of molecular weights, content and distribution of comonomer (or comonomers), method of processing, and the like.

Methods of manufacturing may utilize polyolefin's limited inter- and intra-molecular interactions, capitalizing on the high degree of freedom in the polymer to form different microstructures, and to modify the polymer to provide varied uses in a number of technical markets. However, polyolefin materials may have a number of limitations, which can restrict application such as susceptibility to deformation and degradation in the presence of some chemical agents, and low barrier properties to various gases and a number of volatile organic compounds (VOC). Property limitations may hinder the use of polyolefin materials in the production of articles requiring low permeability to gases and solvents, such as packaging for food products, chemicals, agrochemicals, fuel tanks, water and gas pipes, and geomembranes, for example.

While polyolefins are utilized in industrial applications because of favorable characteristics such as high processability, low production cost, flexibility, low density, and ease of recycling, polyolefin compositions may have physical limitations, such as susceptibility to environmental stress cracking (ESC) and accelerated slow crack growth (SCG). Which may occur below the yield strength limit of the material when subjected to long-term mechanical stress. Polyolefin materials may also exhibit sensitivity to certain groups of chemical substances, which can lead to deformation and degradation. As a result, chemical sensitivities and physical limitations may limit the success in the replacement of other industry standard materials, such as steel and glass, with polyolefin materials because the material durability is insufficient to prevent chemical damage and spillage.

Conventionally, methods of altering the chemical nature of the polymer composition may include modifying the polymer synthesis technique or the inclusion of one or more comonomers. However, modifying the polyolefin may also result in undesirable side effects. By way of illustration, increasing the molecular weight of a polyolefin may produce changes in the SCG and ESC, but can also increase viscosity, which may limit the processability and moldability of the polymer composition.

Other strategies may include inclusion of a comonomer and/or blending polyolefins with other polymer classes and additives to confer various physical and chemical attributes. For example, polyolefins may be copolymerized with alpha-olefins having a lower elastic modulus, which results in a considerable increase in environmental stress cracking resistance (ESCR) and resistance to impact but adversely affects the stiffness of the polymer. However, the use of alpha-olefins may have limited effectiveness because, while the incorporation of alpha-olefin comonomers must occur in the high molecular weight fraction in order to affect ESC and impact resistance, many popular catalyst systems have a low probability of inserting alpha-olefins in the high molecular weight fraction, an important factor in forming "tie molecules" between the chains of the surrounding polyolefin that are responsible for transferring stress between the crystalline regions and, consequently, responsible for important mechanical properties. The end result is the production of a polymer composition having reduced structural stiffness. It is also noted that, while advances have developed catalysts that increase the likelihood of displacing the incorporation of a comonomer to the highest molecular weight range, and that multiple reactors may be used to address these limitations, such modifications are expensive alternatives and not wholly effective in balancing resistance to impact and ESC without negatively affecting stiffness.

Polymer modification by blending may vary the chemical nature of the composition, resulting in changes to the overall physical properties of the material. Material changes introduced by polymer blending may be unpredictable, however, and, depending on the nature of the polymers and additives incorporated, the resulting changes may be uneven and some material attributes may be enhanced while others exhibit notable deficits. The incorporation of a second phase into the matrix polymer, which generally has a different chemical nature, may increase the resistance to impact and ESC resistance in some cases. However, like the copolymerization strategy, polymer blends are often accompanied by a marked loss in stiffness, because the blended materials may have lower elastic modulus than the matrix polyolefin.

Accordingly, were exists a continuing need for developments in polyolefin compositions to have increases in environmental stress cracking resistance while balancing the mechanical properties of the polymer. There also exists a continuing need for polyolefin compositions having good barrier properties to various gases and volatile organic compounds.

SUMMARY

This summary is provided to introduce a selection of concepts that are described further below in the detailed description. This summary is not intended to identify key or essential features of the claimed subject matter, nor is it intended to be used as an aid in limiting the scope of the claimed subject matter.

In one aspect, embodiments of the present disclosure are directed to polymer compositions that may include a polymer matrix containing a polyolefin, one or more polymer particles dispersed in the polymer matrix, wherein the one or more polymer particles include a polar polymer selectively crosslinked with a crosslinking agent, and wherein the one or more polymer particles has an average particle size of up to 200 μm.

In another aspect, embodiments of the present disclosure are directed to processes of preparing a polymer composition may include mixing a polyolefin, a polar polymer, and a crosslinking agent; and selectively crosslinking the polar polymer with the crosslinking agent in the presence of the polyolefin.

In another aspect, embodiments of the present disclosure are directed to methods that may include increasing stress cracking resistance of a polyolefin by mixing a polar polymer with the polyolefin; and selectively crosslinking the polar polymer in the presence of the polyolefin with a crosslinking agent to form crosslinked polar polymer particles dispersed in the polyolefin.

DETAILED DESCRIPTION

Figure 1:
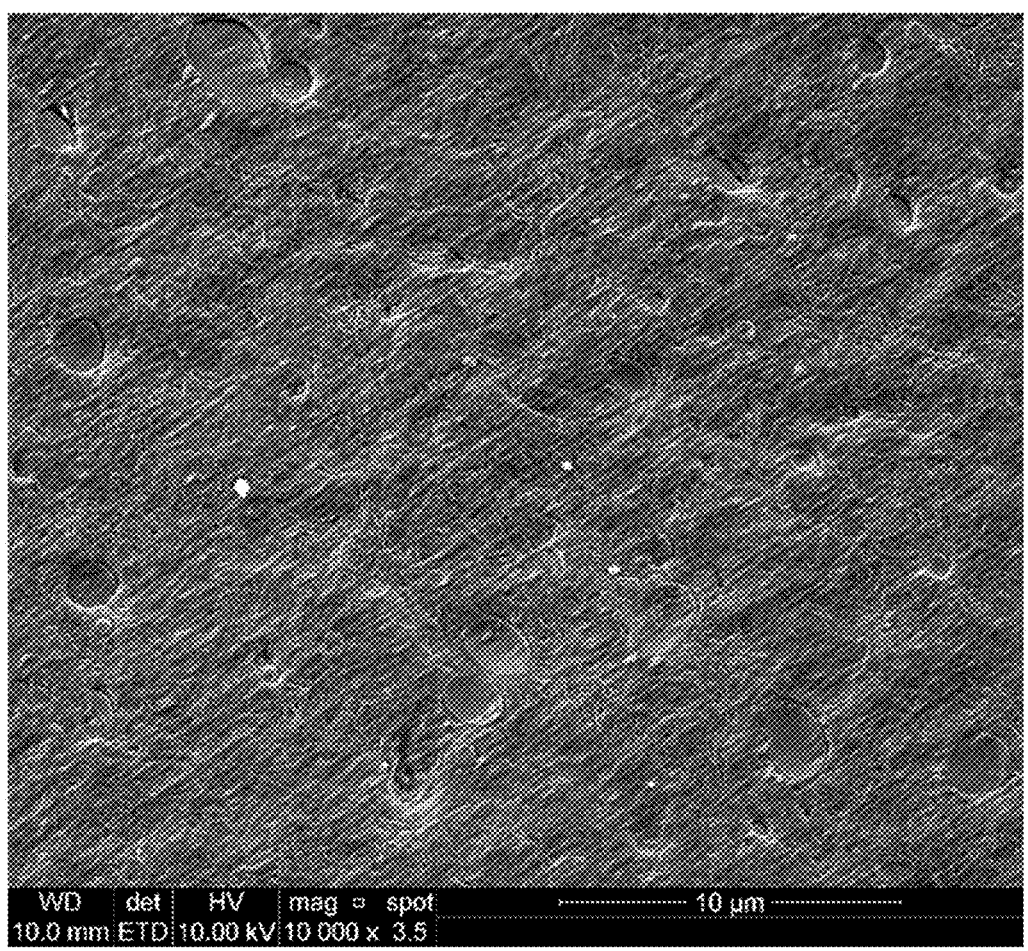
FIGS. 1 and 2 are scanning electron micrographs (SEMs), before and after boiling respectively, of a comparative sample of polyolefin containing a non-crosslinked polar polymer in accordance with embodiments of the present disclosure.

Embodiments of the present disclosure are directed to polymer compositions containing a mixture of polyolefin and polar polymer particles. In one or more embodiments, polymer composition may include a matrix polymer phase containing polyolefin and one or more polar polymer particles dispersed in the matrix phase, where the polar polymer is crosslinked with a crosslinking agent that reacts selectively with functional groups present on the constituent polar polymer. In some embodiments, crosslinks generated in the polar polymer particles by the crosslinking agent may create structural and/or morphological changes that produce a polymer composition exhibiting significantly improved physical and chemical characteristics when compared to a reference composition containing only the respective polyolefin. For example, polymer compositions in accordance with the present disclosure may exhibit gains in environmental stress cracking resistance, while also maintaining a balance of mechanical properties and may also confer improved barrier properties to gases and liquids.

In one or more embodiments, polyolefins may be blended with a polar polymer to adjust various physical and chemical properties of the final composition. Specifically, in one or more embodiments, physical and chemical properties of polymer compositions in accordance with the present disclosure may be modified by blending the polyolefin with a polar polymer having one or more functional groups that are selectively reacted with crosslinking agents, where the crosslinking occurs as or after the polyolefin and polar polymer are blended together, i.e., in the presence of but without reacting with the polyolefin. In some embodiments, in the blended polymer composition, the polar polymer may be in the form of sized particles having dimensions, such as less than 200 μm, suitable for end use applications. Thus, in the blended polymer composition, the polar polymer particles may be dispersed within a polyolefin matrix phase. Optionally, a functionalized polyolefin may be added as a compatibilizing agent, in addition to other additives. Processes of manufacturing polymer compositions in accordance with the present disclosure may include various blending methods such a solubilization, emulsion, suspension or extrusion.

In some embodiments, the polar polymer within the polymer composition may be crosslinked by a crosslinking agent to generate particulates containing intraparticle covalent linkages between the constituent polar polymer chains. Depending on the relative proximity of adjacent polar polymer particles (and concentration), it is also recognized that there may also be inter-particle covalent linkages that are formed. The crosslinked polar polymer particles may create changes in the physical and physicochemical properties, including increases in ESCR, increases in barrier to oxygen and volatile organic compounds (VOC), and improvement in the balance of stiffness/impact resistance mechanical properties in relation to the properties of pure (unmodified or blended) polyolefins. The balance in properties may be expressed through a property balance index, which considers the combination of the flexural modulus, impact resistance and ESCR, discussed in greater detail below. The property balance index may be normalized against a reference polyolefin (without the polar polymer, etc.), and advantageously, the polymer compositions of the present disclosure may achieve a normalized property balance index that ranges from about 1.5 to 10, or from 3 to 6 in more particular embodiments.

In one or more embodiments, polymer compositions may be used in the manufacturing of articles, including rigid and flexible packaging for food products, chemicals, agrochemicals, fuel tanks, water and gas pipes, geomembranes, and the like.

Polyolefin

Polyolefin in accordance with the present disclosure may form a polymer matrix that surrounds other components in the polymer composition such as polar polymer particles and other additives. In one or more embodiments, polyolefins include polymers produced from unsaturated monomers (olefins or "alkenes") with the general chemical formula of $C_nH_{2n}$. In some embodiments, polyolefins may include ethylene homopolymers, copolymers of ethylene and one or more C3-C20 alpha-olefins, propylene homopolymers, heterophasic propylene polymers, copolymers of propylene and one or more comonomers selected from ethylene and C4-C20 alpha-olefins, olefin terpolymers and higher order polymers, and blends obtained from the mixture of one or more of these polymers and/or copolymers.

In one or more embodiments, polymer compositions may contain a percent by weight of the total composition (wt %) of polyolefin ranging from a lower limit selected from one of 30 wt %, 40 wt %, 50 wt %, 60 wt %, 75 wt %, and 85 wt %, to an upper limit selected from one of 60 wt %, 75 wt %, 80 wt %, 90 wt %, 95 wt %, 99.5 wt % and 99.9 wt %, where any lower limit can be used with any upper limit.

Polar Polymers

Polymer compositions in accordance with the present disclosure may include one or more polar polymers that are combined with a polyolefin and, further, may be crosslinked by one or more crosslinking agents. As used herein, a "polar polymer" is understood to mean any polymer containing hydroxyl, carboxylic acid, carboxylate, ester, ether, acetate, amide, amine, epoxy, imide, imine, sulfone, phosphone, and their derivatives, as functional groups, among others. The polar polymer may be selectively crosslinked by an appropriate crosslinking agent, where the selective crosslinking may occur between the functional groups by reacting with a suitable crosslinking agent in the presence of polyolefins, additives, and other materials. Thus, the crosslinking agent is selected to react with the polar polymer but without exhibiting reactivity (or having minimal reactivity towards) the polyolefin (including any functionalized polyolefins present as a compatibilizing agent, discussed below). In some embodiments, polar polymers include polyvinyl alcohol (PVOH), ethylene vinyl alcohol (EVOH) copolymer, ethylene vinyl acetate copolymer (EVA) and mixtures thereof.

One or more polar polymers in accordance with the present disclosure may be produced by hydrolyzing a polyvinyl ester to produce free hydroxyl groups on the polymer backbone. By way of example, polar polymers produced through hydrolysis may include polyvinyl alcohol generated from the hydrolysis of polyvinyl acetate. The degree of hydrolysis for a polymer hydrolyzed to produce a polar polymer may be within the range of 30% and 100% in some embodiments, and between 70% and 99% in some embodiments.

Polar polymers in accordance with the present disclosure may have a weight average molecular weight in the range of 5,000 g/mol to 300,000 g/mol in some embodiments, and between 10,000 g/mol and 180,000 g/mol in some embodiments.

In one or more embodiments, polar polymer in accordance with the present disclosure may form a distinct phase within the polymer composition, which may be in the form of particles having an average particle size of less than 200 µm. Particle size determinations may be made in some embodiments using SEM techniques after the combination with the polyolefin. Polar polymer particles in accordance with the present disclosure may have an average particle size having a lower limit selected from 0.01 µm, 0.5 µm, 1 µm, and 5 µm, and an upper limit selected from 10 µm, 20 µm, 30 µm, 50 µm, and 200 µm, where any lower limit may be used with any upper limit.

In one or more embodiments, polymer compositions may contain a percent by weight of the total composition (wt %) of polar polymer ranging from a lower limit selected from one of 0.1 wt %, 0.25 wt %, 0.5 wt %, 1 wt %, 2 wt %, 5 wt %, 10 wt %, 15 wt %, and 25 wt %, to an upper limit selected from one of 5 wt %, 10 wt %, 15 wt %, 25 wt %, 50 wt %, 60 wt %, and 70 wt %, where any lower limit can be used with any upper limit.

Functionalized Polyolefin

In some embodiments, compatibilizing agents such as functionalized polyolefins may be added to modify the interactions between the polyolefin and the polar polymer. As used herein, "functionalized polyolefin" (or compatibilizing agent) is understood to mean any polyolefin which had its chemical composition altered by grafting or copolymerization, or other chemical process, using polar functionalizing reagents. Functionalized polyolefins in accordance with the present disclosure include polyolefins functionalized with maleic anhydride, maleic acid, acrylic acid, methacrylic acid, itaconic acid, itaconic anhydride, methacrylate, acrylate, epoxy, silane, succinic acid, succinic anhydride, ionomers, and their derivatives, or any other polar comonomer, and mixtures thereof, produced in a reactor or by grafting.

In one or more embodiments, polymer compositions may contain a percent by weight of the total composition (wt %) of functionalized polyolefin ranging from a lower limit selected from one of 0.1 wt %, 0.5 wt %, 1 wt %, and 5 wt %, to an upper limit selected from one of 5 wt %, 7.5 wt %, 10 wt %, and 15 wt %, where any lower limit can be used with any upper limit.

Crosslinking Agent

In one or more embodiments, a crosslinking agent may be used to crosslink a selected polymer phase in a polymer composition. As used herein, a "crosslinking agent" is understood to mean any bi- or multi-functional chemical substance capable of reacting selectively with the polar groups of a polymer, forming crosslinks between and within the constituent polymer chains. As used herein, "selective" or "selectively" used alone or in conjunction with "crosslinking" or "crosslinked" is used to specify that the crosslinking agent reacts exclusively with the polar polymer, or that the crosslinking agent reacts with the polar polymer to a substantially greater degree (98% or greater, for example) than with respect to the polyolefin polymer.

In one or more embodiments, crosslinking agents in accordance with the present disclosure may include linear, branched, saturated, and unsaturated carbon chains containing functional groups that react with counterpart functional groups present on the backbone and termini of a polar polymer incorporated into a polymer composition. In some embodiments, crosslinking agents may be added to a pre-mixed polymer blend containing a polyolefin and polar polymer particles, in order to crosslink the polar polymer in the presence of the polyolefin. Following addition to the pre-mixed polymer blend, a crosslinking agent may react with the polar polymer within the particles, creating intra-particle crosslinks between the polar polymer chains. Crosslinking agents in accordance with the present disclosure may include, for example, maleic anhydride, maleic acid, itaconic acid, itaconic anhydride, succinic acid, succinic anhydride, succinic aldehyde, adipic acid, adipic anhydride, phthalic anhydride and acids thereof, glutaraldehyde, their derivatives and mixtures thereof.

In one or more embodiments, crosslinking agents may be added to a blend used to form a polymer composition at a percent by weight (wt %) of the blend ranging from a lower limit selected from one of 0.001 wt %, 0.01 wt %, 0.05 wt %, 0.5 wt %, 1 wt %, and 2 wt % to an upper limit selected from one of 1.5 wt %, 2 wt %, 5 wt %, and 10 wt %, where any lower limit can be used with any upper limit.

Additives

In one or more embodiments, the polymer compositions of the present disclosure may contain a number of other functional additives that modify various properties of the composition such as antioxidants, pigments, fillers, reinforcements, adhesion-promoting agents, biocides, whitening agents, nucleating agents, anti-statics, anti-blocking agents, processing aids, flame-retardants, plasticizers, light stabilizers, and the like.

Polymer compositions in accordance with the present disclosure may include fillers and additives that modify various physical and chemical properties when added to the polymer composition during blending. In one or more embodiments, fillers and nanofillers may be added to a polymer composition to increase the barrier properties of the material by increasing the tortuous path of the polymer matrix for the passage of permeate molecules. As used herein, "nanofiller" is defined as any inorganic substance with at least a nanometric, scale dimension. Polymer composition in accordance with the present disclosure may be loaded with a filler and/or nanofiller that may include polyhedral oligomeric silsesquioxane (POSS), clays, nanoclays, silica particles, nanosilica, calcium nanocarbonate, metal oxide particles and nanoparticles, inorganic salt particles and nanoparticles, and mixtures thereof.

Fillers and/or nanofillers in accordance with the present disclosure may be incorporated into a polymer composition at a percent by weight (wt %) that ranges from 0.001 wt % and 5 wt % in some embodiments, and from 0.1 wt % to 2 wt % in some embodiments.

In one or more embodiments, polymer compositions may contain a percent by weight of the total composition (wt %) of one or more additives ranging from a lower limit selected from one of 0.001 wt %, 0.01 wt %, 0.05 wt %, 0.5 wt %, and 1 wt %, to an upper limit selected from one of 1.5 wt %, 2 wt %, 5 wt %, and 7 wt %, where any lower limit can be used with any upper limit.

Polymer compositions in accordance with the present disclosure may be formulated as a "masterbatch" in which the polymer composition contains concentrations of polar polymer that are high relative to the polar polymer concentration in a final polymer blend for manufacture or use. For example, a masterbatch stock may be formulated for storage or transport and, when desired, be combined with additional polyolefin or other materials in order to produce a final polymer composition having concentration of constituent components that provides physical and chemical properties tailored to a selected end-use.

One or more of the wt % values mentioned above with respect to each of the components refer in fact to amounts that may be used to form such a masterbatch. In one or more embodiments, a masterbatch polymer composition may contain a percent by weight of the total composition (wt %) of crosslinked polar polymer ranging from a lower limit selected from one of 10 wt %, 20 wt % 25 wt %, 30 wt %, 40 wt %, and 50 wt % to an upper limit selected from one of 50 wt %, 60 wt %, and 70 wt %, where any lower limit can be used with any upper limit. Similarly, a masterbatch may include a polyolefin in an amount that ranges from a lower limit selected from 30 wt %, 40 wt %, and 50 wt % to an upper limit selected from one of 50 wt %, 60 wt %, 70 wt %, 75 wt %, 80 wt %, and 90 wt %, where any lower limit can be used with any upper limit. It is also envisioned that the functionalized polyolefin may be present at an amount ranging from a lower limit selected from one of 0.1 wt %, 0.5 wt %, 1 wt %, and 5 wt %, to an upper limit selected from one of 5 wt %, 7.5 wt %, 10 wt %, and 15 wt %, where any lower limit can be used with any upper limit. Fillers or other additives may also be included, as described above.

As noted, in the masterbatch composition, the polymer composition contains concentrations of polar polymer that are high relative to the polar polymer concentration in a final polymer blend for manufacture or use. Thus, prior to use to form a manufactured article, the masterbatch composition may be combined with an additional quantity of polyolefin to arrive at a polar polymer concentration in the final composition that is lower than the masterbatch concentration. Further, when it is desirable to form a manufactured article without use of a masterbatch composition, the lower quantities of crosslinked polar polymer and higher quantities of polyolefin (from the ranges mentioned above) may be used.

For example, a polymer composition that is to be used directly in the manufacture of a manufactured article, without additional polyolefin added thereto, may contain a percent by weight of the total composition (wt %) of crosslinked polar polymer ranging from a lower limit selected from one of 0.5 wt %, 1 wt %, 2 wt %, and 5 wt %, to an upper limit selected from one of 5 wt %, 6 wt %, 8 wt %, 10 wt %, 15 wt %, 25 wt %, and 50 wt %, where any lower limit can be used with any upper limit. Similarly, such composition may include a polyolefin in an amount that ranges from a lower limit selected from 50 wt %, 75 wt %, 85 wt %, and 90 wt % to an upper limit selected from one of 85 wt %, 90 wt %, 95 wt %, 98 wt %, 99 wt %, and 99.5 wt %, where any lower limit can be used with any upper limit. It is also envisioned that the functionalized polyolefin may be present at an amount ranging from a lower limit selected from one of 0.1 wt %, 0.5 wt %, 1 wt %, 2 wt %, and 5 wt %, to an upper limit selected from one of 5 wt %, 7.5 wt %, 10 wt %, where any lower limit can be used with any upper limit. Fillers or other additives may also be included, as described above.

Polymer Composition Preparation Methods

Polymer compositions in accordance with the present disclosure may be prepared by a number of possible polymer blending and formulation techniques, which will be discussed in the following sections.

Solubilization

Polymer compositions in accordance with the present disclosure may be prepared from the constituent components using a number of techniques. In one or more embodiments, a matrix polymer (and functionalized polyolefin in some cases) are solubilized in a suitable organic solvent such as decalin, 1,2-dichlorobenzene, 1,1,1,3,3,3-hexafluor isopropanol, and the like. The solvent mixture may then be heated to a temperature, such as between 23° C. and 130° C., under stirring. In parallel, a polar polymer is solubilized in a suitable organic solvent and temperature. Next, both the matrix polymer solution and the polar polymer solution are mixed under stirring and a crosslinking agent is added to selectively crosslink the polar polymer, forming dispersed particles of crosslinked polar polymer in a polyolefin matrix.

Extrusion

In one or more embodiments, polymer compositions in accordance with the present disclosure may be prepared using continuous or discontinuous extrusion. Methods may use single-, twin- or multi-screw extruders, which may be used at temperatures ranging from 100° C. to 270° C. in some embodiments, and from 140° C. to 230° C. in some embodiments. In some embodiments, raw materials are added to an extruder, simultaneously or sequentially, into the main or secondary feeder in the form of powder, granules, flakes or dispersion in liquids as solutions, emulsions and suspensions of one or more components.

The components can be pre-dispersed in prior processes using intensive mixers, for example. Inside an extrusion equipment, the components are heated by heat exchange and/or mechanical friction, the phases are melt and the dispersion occurs by the deformation of the polymer. In some embodiments, one or more compatibilizing agents (such as a functionalized polyolefin) between polymers of different natures may be used to facilitate and/or reline the distribution of the polymer phases and to enable the formation of the morphology of conventional blend and/or of semi-interpenetrating network at the interface between the phases. The crosslinking agent can be added at the same extrusion stage or in a consecutive extrusion, according to selectivity and reactivity of the system.

In one or more embodiments, methods of preparing polymer compositions may involve a single extrusion or multiple extrusions following the sequences of the blend preparation stages. Blending and extrusion also involve the selective crosslinking of the polar polymer in the dispersed phase of the polymer composition by the crosslinking agent.

Extrusion techniques in accordance with the present disclosure may also involve the preparation of a polar polymer concentrate (a masterbatch), combined with a crosslinking agent in some embodiments, that is then combined with other components to produce a polymer composition of the present disclosure. In some embodiments, the morphology of a crosslinked polar polymer may be stabilized by crosslinking when dispersed in a polymer matrix containing polyolefins and is not dependent on subsequent processes for defining the morphology.

Polymer compositions prepared by extrusion may be in the form of granules that are applicable to different molding processes, including processes selected from extrusion molding, injection molding, thermoforming, cast film extrusion, blown film extrusion, foaming, extrusion blow-molding, ISBM (Injection Stretched Blow-Molding), rotomolding, pultrusion, and the like, to produce manufactured articles.

EXAMPLES

In the following examples, a number of polymer samples are analyzed to demonstrate the changes in physical and chemical properties associated with polymer compositions prepared in accordance with the present disclosure.

Characterization Techniques

Prepared samples were characterized using a number of standardized and lab-based polymer characterization techniques discussed below.

Permeability to Volatile Organic Compounds (VOC)

Samples were hot pressed in accordance with ASTM D-4703 on 250 micron thick films. Permeation to the VOC generated by a mixture of toluene and isooctane at a ratio of 1:1 by volume was evaluated by the pervaporation method using internally developed equipment. The pervaporation system includes a cell having a permeation area of 45 cm$^2$ into which a sample film was placed separating the cell into two compartments, one kept under positive pressure with the VOC feed, and the second under vacuum. The permeated vapor was cooled and collected in Dewar flasks and gravimetrically determined. The pervaporation tests were carried out at a temperature of 40° C. The relative barrier values were calculated based on the results of permeation for the respective unmodified polyolefin reference.

In one or more embodiments, polymer compositions in accordance with present disclosure may exhibit up to 60% increase in barrier to VOC when compared to a reference polyolefin.

Permeability to Oxygen

Samples were hot pressed on films in accordance with ASTM D-4703 and the permeability rate to oxygen in stationary state was determined in accordance with ASTM F-1927 using OX-TRAN® Model MH2/21 oxygen transmission rate test equipment from Mocon, Inc., equipped with a coulometric sensor. The relative barrier values were calculated based on the results of permeation for the respective unmodified polyolefin reference.

In one or more embodiments, polymer compositions in accordance with present disclosure may exhibit up to 60% increase in barrier strength to oxygen when compared to a reference polyolefin according to ASTM F-1927.

Environmental Stress Cracking Resistance (ECR)

For environmental stress cracking resistance tests, sample formulations were hot pressed in 3 mm thick plaques according to ASTM D-4703, at 200° C. and under pressure. Samples were notched, bent to achieve deformation and placed in a metal U-shaped specimen holder in accordance with ASTM D-1693, and placed in an aqueous solution containing nonylphenol ethoxylate (IGEPAL™ CO-630 from Solvay) at a percent by volume (vol %) of 10 vol %. Failure was determined as the appearance of any crack visible by the naked eye.

Flexural Modulus

The stiffness of the material given by the secant modulus at 1% of deformation was determined in the flexural resistance test in accordance with ASTM D-790. The samples were previously hot pressed in accordance with ASTM D-4703.

IZOD Impact Resistance Test

The samples were hot pressed in accordance with ASTM D-4703 to carry out the IZOD resistance to impact standardized by ASTM D-256.

Scanning Electron Microscopy (SEM)

Particle size may be determined by calculating relevant statistical data regarding particle size. In some embodiments, SEM imaging may be used to calculate particle size and develop size ranges using statistical analysis known for polymers and blends. Samples were examined using SEM after hot pressing the samples in accordance with ASTM D-4703 and polishing by cryo-ultramicrotomy. When indicated, some samples were submitted to the extraction process of the polar phase (PVOH) by contacting the sample with boiling water for 2 hours. Samples were dried and submitted to metallization with gold. The images were obtained by FESEM (Field Emission Scanning Electron Microscopy, Model Inspect F50, from FEI), or by Tabletop SEM (Model TM-1000, from Hitachi). The size of each polar polymer domain, or particle when selectively crosslinked by the crosslinking agent, is measured from these images using the software LAS (version 43, from Leica). Calibration is performed using the scale bar of each image and the measured values are statistically analyzed by the software. The average value and standard deviation are given by the measurement of, at least, 300 particles or domains.

Definition of the Property Balance Index

Changes in physical and chemical properties of polymer compositions in accordance with the present disclosure are characterized using an index of properties that may be used to quantify the changes in a respective polymer composition based on a balance of mechanical and ESCR properties. Improvements in a material's modulus, resistance to impact and ESCR may translate to better performance in various applications. However, improvements in a single property may be offset by losses in other properties. In order to quantify the overall improvement of the material, the product of the individual properties is monitored in the examples below. The "Property Balance Index" (FBI) is defined as shown in Eq. 1 to quantify the property changes, wherein "FM" is the flexural secant modulus at 1% deformation, "IR" is the IZOD resistance to impact at 23° C., and "ESCR" is the environmental stress cracking resistance.

$$PBI = \frac{FM \times IR \times ESCR}{10^7} \quad (1)$$

Definition of the Normalized Property Balance Index

To compare the magnitude of property changes for different polymer systems, the PBI values were normalized according to Eq. 2, where $N_{PBI}$ is the normalized property balance index, $PBI_{sample}$ is the property balance index obtained for the samples of this selective reaction blend technology and $PBI_{reference}$ is the property balance index obtained for the reference samples, i.e., a polymer composition comprising the polyolefin used in the sample.

$$N_{PBI} = \frac{PBI_{sample}}{PBI_{reference}} \quad (2)$$

Polymer compositions in accordance with the present disclosure may exhibit an $N_{PBI}$ falling within the range of 1 to 10 in some embodiments, and within the range of 3 to 6 in some embodiments.

Sample Polymer Compositions

Materials used in the example formulations are shown in Table 1, where the polyolefins studied include high density polyethylene (HDPE) and linear low density polyethylene (LLDPE); compatibilizing agents include HDPE functionalized with maleic anhydride (HDPE-MAH) and low density polyethylene functionalized with maleic anhydride (LDPE-MAH); polar polymers studied include polyvinyl alcohol (PVOH); and crosslinking agents include maleic anhydride.

TABLE 1

Materials used in examples.

| Materials | 1F (g/10 min 190° C., 21.6 kg ASTM-D1238) | Distribution of Molecular Weight | Density (g/cm³) D1505/D792 | Remarks |
|---|---|---|---|---|
| HDPE 1 | 0.30 | Monomodal | 0.95 | — |
| HDPE 2 | 0.21 | Bimodal | 0.95 | — |
| HDPE 3 | 0.34 | Bimodal | 0.96 | — |
| LLDPE | 1.0 | Monomodal | 0.92 | — |
| HDPE-MAH | 4.0 | — | 0.95 | — |
| LDPE-MAH | 8.0 | — | 0.93 | — |
| Polyvinyl alcohol (PVOH) | — | — | 1.3 | Degree of hydrolysis: 99% |
| Crosslinking agent | — | — | — | Maleic anhydride |

Table 2 presents the formulations analyzed in the following examples, including the method of preparation of the polymer compositions, wherein the method of preparation is designated "S" for solubilization and "E" refers to extrusion blending "Reference" samples describe polymer compositions containing only polyolefin without the addition of polar polymer, compatibilizing agents, and crosslinking agents. "Comparative" samples refer to the simple blends, containing polyolefin, polar polymer, and compatibilizing agent, without adding the crosslinking agent Formulations denoted "Sample" are compositions containing mixtures of polyolefin and polar polymer that have been selectively crosslinked by a crosslinking agent. The $N_{PBI}$ values demonstrating the increase in physical properties over the respective reference polymers are also presented in Table 2.

Sample Preparation

Solubilization

In order to prepare samples by solubilization, the polymers, crosslinking agent and other additives were combined in a suitable organic solvent such as 1,2-dichlorobenzene or N-methyl-2-pyrrolidone, followed by solvent evaporation.

Extrusion

In order to prepare samples by extrusion, the polymers, crosslinking agents and additives were combined and extruded in a corotating interpenetrating twin screw extruder with temperature profile ranging from 150 to 230° C., followed by pelletization, and hot pressing films or plaques.

Example 1

Samples were formulated as described in Table 2 and evaluated using various methods. For the purpose of comparison of barrier results, the pure (unmodified and unblended) polymers are represented as 0% of barrier improvement, having no gains. Reference compositions and results are shown in Table 3. Comparative formulations containing a blend of polyolefin and polar polymer (without crosslinking) are shown in Table 4. Sample polymer compositions were also prepared from a blend of polyolefin, polar polymer, and crosslinking agent as shown in Table 5.

TABLE 3

Reference compositions and analysis results.

| Samples | ASTM-1927 Barrier to O2 (%) | Internal method Barrier to VOC (%) | ASTM D-1693 ESCR (h) | ASTM D-790 Flexural modulus (MPa) | ASTM D-256 IZOD impact resistance at 23° C. (J/m) |
|---|---|---|---|---|---|
| Reference 1-S | — | 0 | — | — | — |
| Reference 1-E | — | 0 | 180 | 1273 | 313 |
| Reference 2-E | 0 | — | — | — | — |
| Reference 3-E | — | — | 150 | 1100 | 168 |
| Reference 4-E | — | — | 14 | 1629 | 159 |

TABLE 2

Sample formulations

| Samples | S/E | Base Resin | PVOH (wt %) | Compatibilizing agent (wt %) | Crosslinking agent (wt %) | $N_{PBI}$ |
|---|---|---|---|---|---|---|
| Reference 1-S | S | HDPE 1 | 0 | 0 | 0 | 1 |
| Reference 1-E | E | HDPE 1 | 0 | 0 | 0 | 1 |
| Reference 2-E | E | LLDPE | 0 | 0 | 0 | 1 |
| Reference 3-E | E | HDPE 2 | 0 | 0 | 0 | 1 |
| Reference 4-E | E | HDPE 3 | 0 | 0 | 0 | 1 |
| Comparative A-S | S | HDPE 1 | 5 | 10 | 0 | — |
| Comparative B-E | E | HDPE 1 | 7 | 10 | 0 | 0.28 |
| Comparative C-E | E | HDPE 1 | 7 | 1 | 0 | 0.62 |
| Sample 1-A-S | S | HDPE 1 | 5 | 10 | 2 | — |
| Sample 1-B-E | E | HDPE 1 | 7 | 10 | 3 | 1.5 |
| Sample 1-C-S | S | LLDPE | 7 | 10 | 3 | — |
| Sample 1-D-E | E | LLDPE | 7 | 10 | 3 | — |
| Sample 2-A-E | E | HDPE 1 | 7 | 1 | 3 | 5.7 |
| Sample 3-A-E | E | HDPE 1 | 7 | 1 | 0.5 | 5.7 |
| Sample 3-B-E | E | HDPE 1 | 7 | 1 | 1 | — |
| Sample 3-C-E | E | HDPE 1 | 7 | 1 | 1.5 | 5.7 |
| Sample 4-B-E | E | HDPE 1 | 3 | 1 | 0.5 | 3.4 |
| Sample 4-C-E | E | HDPE 1 | 5 | 1 | 0.5 | 4.8 |
| Sample 5-A-E | E | HDPE 2 | 7 | 1 | 0.5 | 6.5 |
| Sample 6-A-E | E | HDPE 3 | 7 | 1 | 0.5 | 3.4 |

TABLE 4

Comparative compositions and analysis results.

| Samples | ASTM-1927 Barrier to O2 (%) | Internal method Barrier to VOC (%) | ASTM D-1693 ESCR (h) | ASTM D-790 Flexural modulus (MPa) | ASTM D-256 IZOD impact resistance at 23° C. (J/m) |
|---|---|---|---|---|---|
| Comparative A-S | — | 13 | — | — | — |
| Comparative B-E | — | 2 | 110 | 1076 | 170 |
| Comparative C-E | — | 1 | 95.7 | 1282 | 356 |

TABLE 5

Sample compositions and analysis results.

| Samples | ASTM-1927 Barrier to O2 (%) | Internal method Barrier to VOC (%) | ASTM D-1693 ESCR (h) | ASTM D-790 Flexural modulus (MPa) | ASTM D-256 IZOD impact resistance at 23° C. (J/m) |
|---|---|---|---|---|---|
| Sample 1-A-S | — | 50 | — | — | — |
| Sample 1-B-E | — | 34 | 600 | 1058 | 168 |
| Sample 1-C-S | 49 | — | — | — | — |
| Sample 1-D-E | 27 | — | — | — | — |

By comparison of Tables 3 and 4, it can be noted that the simple blend with PVOH generates very minor barrier gains (Comparative BE and A-S), even when prepared in solution. Also noted is that the presence of a compatibilizing agent appears to drastically decrease the stiffness of the resin (Comparative B-E, when compared to Reference 1-E). With the reduction of the compatibilizing agent content (Comparative C-E), the mechanical properties remain stable with respect to Reference 1-E. Regarding ECR of the samples, the simple blend of HDPE with PVOH (Comparative C-E) generates significant loss in this property compared to Reference 1-E, which is then improved with the use of a crosslinking agent (Sample 3-A-E from Table 5, for example).

With particular respect to Table 5, a comparison was also performed between samples prepared by solubilization (Reference 1-S, Comparative A-S, and Sample 1-A-S) and extrusion of the components in the presence of crosslinking agent (Reference 1-E, Comparative C-E, AND Sample 3-A-E, for example). Samples prepared by solubilization and extrusion appeared to exhibit improved barrier properties, and it was noted generally that larger improvements were associated with formulations prepared by solubilization. Sample 1-B-E also exhibited a significant gain in ESCR (600 hours) even compared to respective Reference 1-E (180 hours).

Example 2

In the next example, Table 6 demonstrates a comparison between samples with different concentrations of compatibilizing agent. For example, Comparative B-E and Sample 1-B-E containing 10 wt % compatibilizing agent each exhibit modest changes in physical properties over Reference 1-E, but a clear reduction in impact resistance when compared to other formulations containing reduced amounts of compatibilizing agent (Comparative C-E and Sample 2-A-E, for example).

TABLE 6

Sample compositions and analysis results

| Samples | ASTM-1927 % Barrier to O2 | Internal method % Barrier to VOC | ASTM D-1693 ESCR (h) | ASTM D-790 Flexural modulus (MPa) | ASTM D-256 IZOD impact resistance at 23° C. |
|---|---|---|---|---|---|
| Reference 1-E | — | 0 | 180 | 1273 | 313 |
| Comparative C-E | — | 1 | 95.7 | 1282 | 356 |
| Comparative B-E | — | 2 | 110 | 1076 | 170 |
| Sample 1-B-E | — | 34 | 600 | 1058 | 168 |
| Sample 2-A-E | — | — | >1000 | 1051 | 356 |
| Sample 3-A-E | — | — | >1000 | 1237 | 303 |

Table 7 demonstrates the effect of crosslinking agent concentration on the material properties. It can be noted that, with the reduction of the crosslinking agent content, the module of the resin increases, often returning to the same level of the reference composition. Results from Table 6 and 7 show that the properties of the materials, and in effect the PBI, may be tuned by varying the concentration of compatibilizing agent and crosslinking agent and, in some embodiments, polymer blends in accordance with the present disclosure may exhibit an increase in ESCR while maintaining a stiffness and impact resistance relative to the respective reference composition.

TABLE 7

Sample compositions and analysis results.

| Samples | ASTM D-1693 ESCR (h) | ASTM D-790 Flexural modulus (MPa) | ASTM D-256 IZOD impact resistance at 23° C. (J/m) |
|---|---|---|---|
| Sample 2-A-E | >1000 | 1051 | 356 |
| Sample 3-A-E | >1000 | 1237 | 303 |
| Sample 3-B-E | >1000 | 1258 | 304 |
| Sample 3-C-E | >1000 | 1272 | 315 |

Example 3

Figure 2:
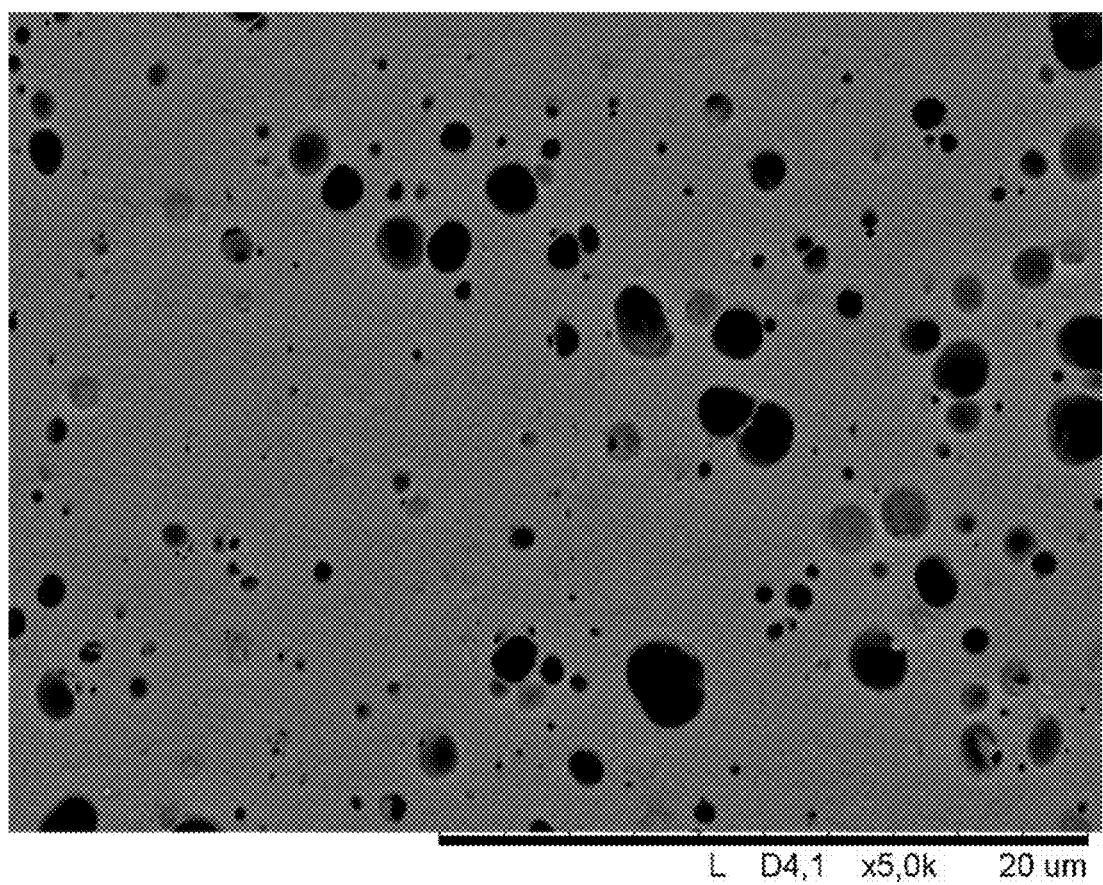
Figure 3:
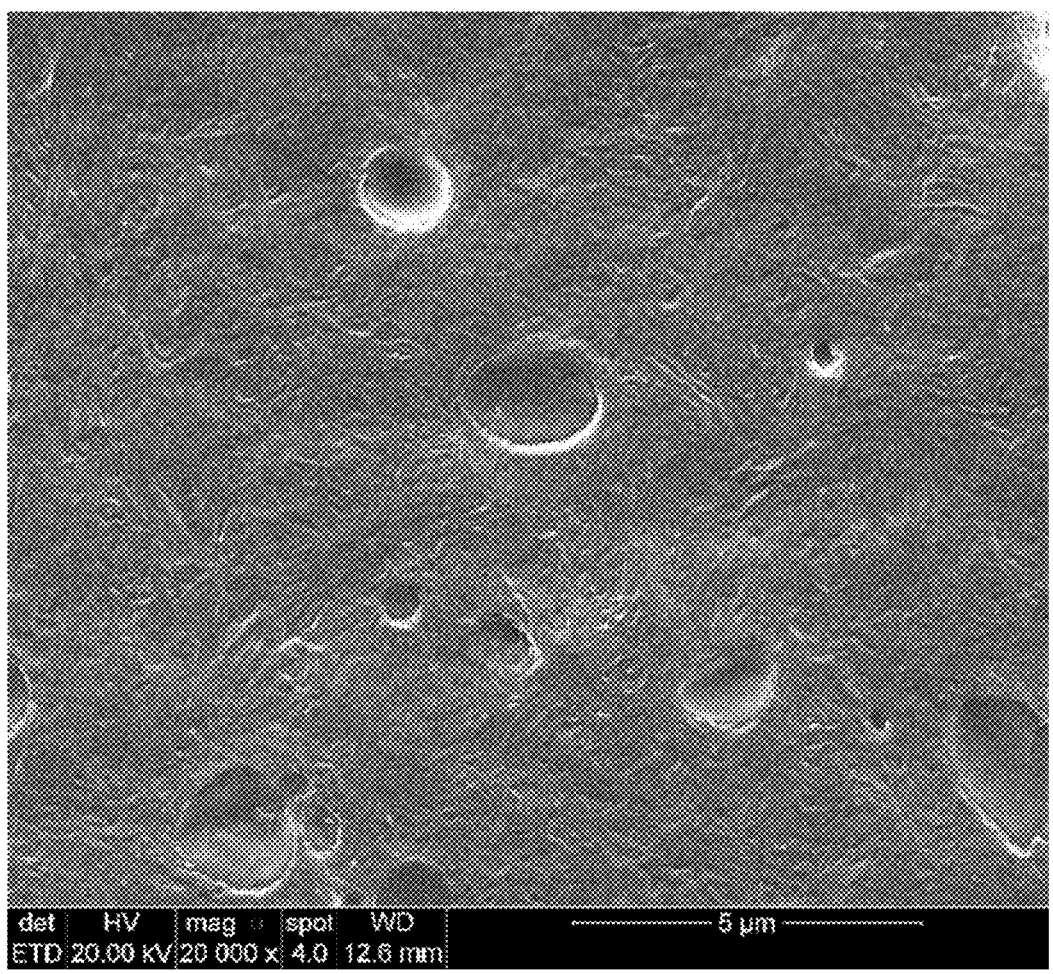
FIGS. 3-5 are SEMs of polymer compositions containing polyolefin and crosslinked polar polymer in accordance with embodiments of the present disclosure.
Figure 4:
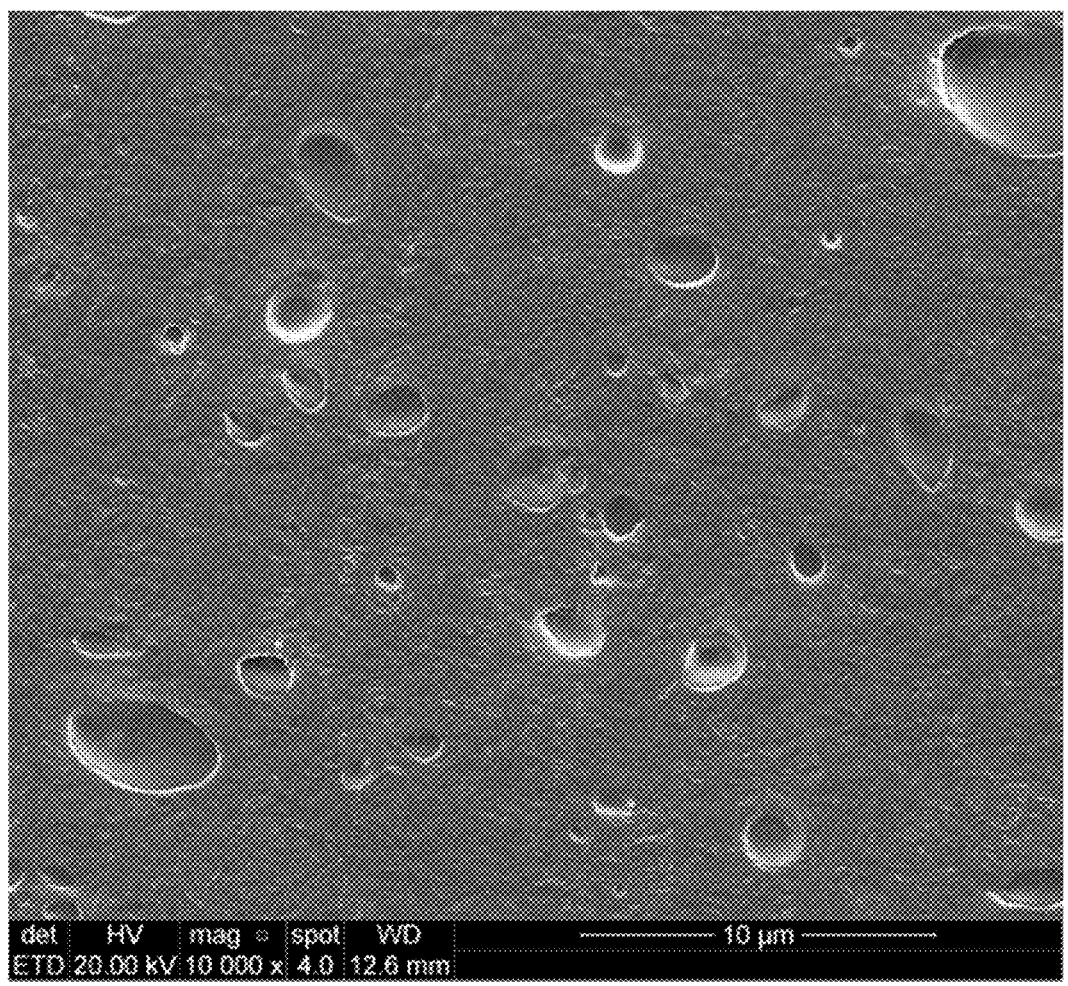
Figure 5:
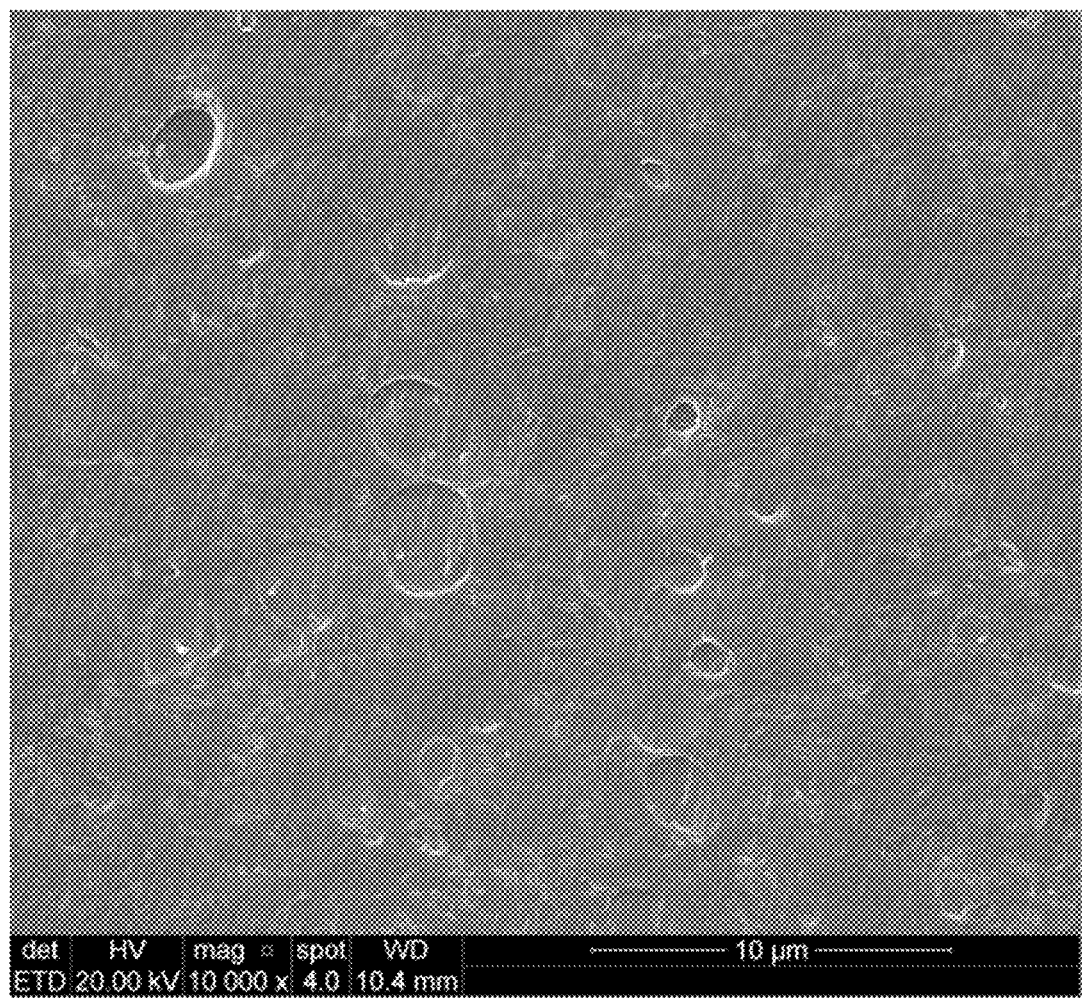

Selected samples were also evaluated by SEM to analyze the stability of the polymer formulations. SEM images for Comparative C-E are shown before (FIG. 1) and after (FIG. 2) exposure to boiling water for 2 hours and, as demonstrated, the polar polymer PVOH is removed from the matrix through exposure to boiling water for 2 hours. For samples containing crosslinking agent, FIG. 3 depicts Sample 1-B-E (with 3% of crosslinking agent), FIG. 4 depicts Sample 3-A-E (with 0.5% of crosslinking agent), and FIG. 5 depicts Sample 3-C-E (with 1.5% of crosslinking agent), all after exposure to boiling water for 2 hours. As demonstrated in all crosslinked samples, the polar polymer particles become non-extractable following crosslinking as evidenced by the decreased solubility of the polar polymer after boiling.

Example 4

In the next example, the effect of the concentration of polar polymer PVOH and crosslinking agent was analyzed in comparison to the Reference and Comparative formulations. Results of analytical testing are shown in Table 8.

TABLE 8

Comparative results varying the content of PVOH.

| Samples | ASTM D-1693 ESCR (h) | ASTM D-790 Flexural modulus (MPa) | ASTM D-256 IZOD impact resistance at 23° C. (J/m) |
| --- | --- | --- | --- |
| Reference 1-E | 180 | 1273 | 313 |
| Comparative C-E | 95.7 | 1282 | 356 |
| Sample 4-B-E | 800 | 1204 | 247 |
| Sample 4-C-E | >1000 | 1231 | 280 |
| Sample 3-A-E | >1000 | 1337 | 303 |

Figure 6:
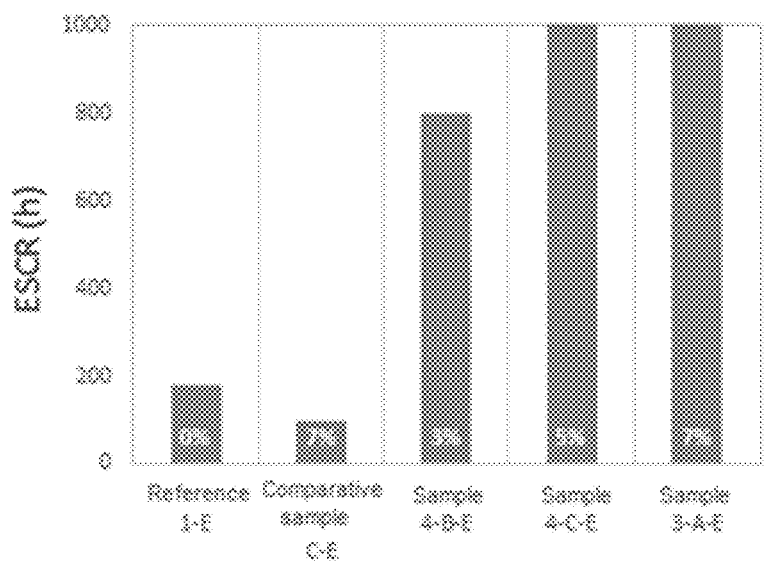
FIG. 6 is a graphical representation depicting the change in environmental stress cracking resistance (ESCR) as a function of polyvinyl alcohol (PVOH) content in accordance with embodiments of the present disclosure.
Figure 7:
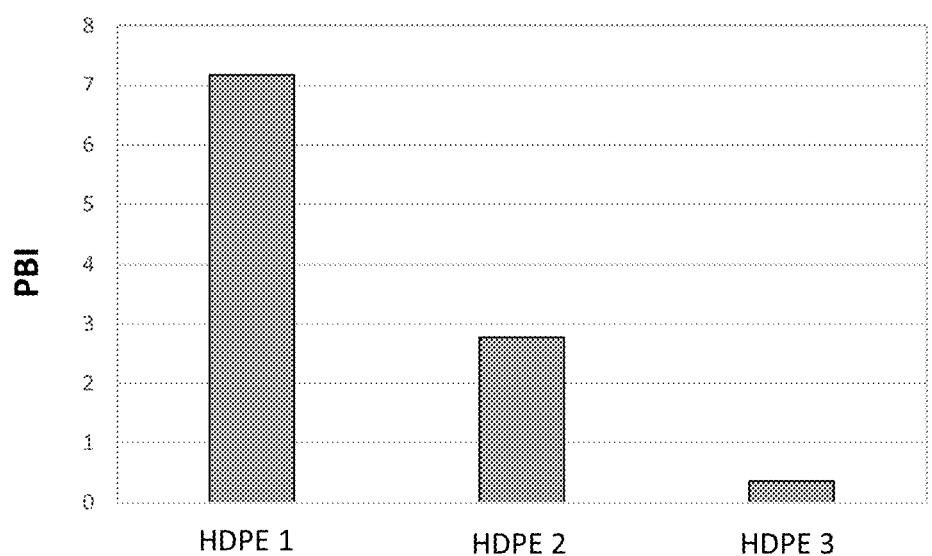
FIG. 7 is a graphical representation depicting the property balance index (PBI) for a number of polymer compositions generated in accordance with embodiments of the present disclosure.

With particular respect to FIG. 6, the change in ESCR as a function of PVOH content is demonstrated. Comparative results between pure polyethylene and blends with different PVOH contents are shown, with or without crosslinking agent, where the percentage values inside the bars indicate the polar polymer PVOH content. As demonstrated, the ESCR for the polymer compositions increases with increasing crosslinked PVOH content, with the addition of 3% of crosslinked PVOH (Sample 4-B-E) producing a notable increase in ESCR over the reference composition. For other PVOH contents, the polymer compositions exhibit a continued increase in ESCR, while retaining stiffness (as measured by flexural modulus) and impact resistance levels, as indicated in Table 8. By way of contrast, for other technological solutions to improve ESCR to the levels demonstrated in Table 8, such as increasing molar weight of the polymers or adding comonomers, the final compositions show a corresponding decrease in stiffness and impact resistance balance.

Figure 8:
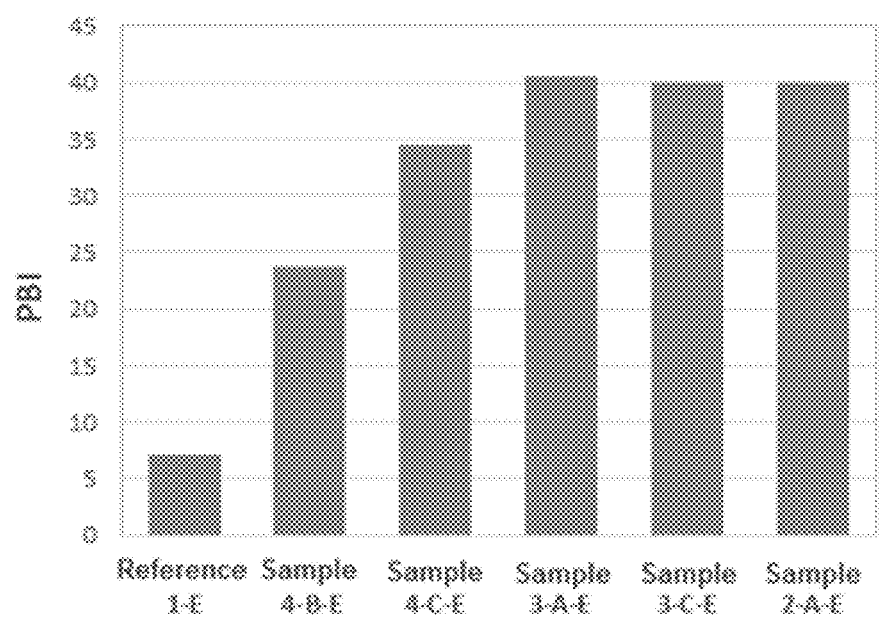
FIG. 8 is a graphical representation depicting changes in PBI for polymer compositions generated in accordance with embodiments of the present disclosure.

With particular respect to FIG. 8, the PSI for each of the reference polyolefins HDPE 1, HDPE 2, and HDPE 3 is shown. With respect to FIG. 8, the PBI is shown for various samples based on Reference 1-E (HDPE 1 polyolefin) and containing selected concentrations of crosslinked polar polymer. As demonstrated in FIG. 8, the PBI increases in samples formulated with a crosslinked polar polymer, indicating an increase in ESCR for the samples in combination with sustained mechanical properties.

Figure 9:
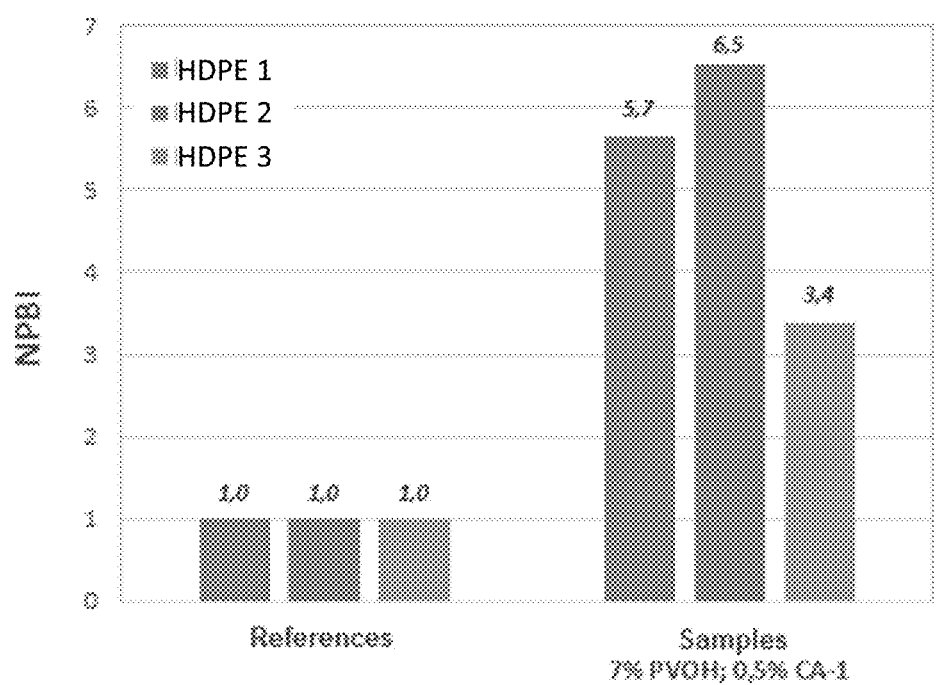
FIG. 9 is a graphical representation depicting relative changes in FBI for selected polymer composition samples generated in accordance with embodiments of the present disclosure.

With particular respect to FIG. 9, a graph is presented showing a comparison of different types of polyolefin, HDPE 1, 2, and 3 reference polymers with sample polymer compositions modified with 7% of PVOH and 0.5% of crosslinking agent and 1% of compatibilizing agent. FIG. 9 demonstrates that an $N_{PBI}$ for all studied polyolefin systems over the respective reference polymers.

Example 5

In this example, the modality of the polyethylene molecular weight distribution is evaluated. Monomodal sample Reference 1-E and the counterpart Sample 3-A-E containing a crosslinked polar polymer are shown in comparison to bimodal samples Reference 3-E and Reference 4-E, and the respective compositions Sample 5-A-E and Sample 6-A-E containing a crosslinked polar polymer in Table 9.

TABLE 9

Comparative results varying the high density polyethylene (monomodal and bimodal).

| Samples | ASTM D-1693 ESCR (h) | ASTM D-790 Flexural modulus (MPa) | ASTM D-256 IZOD impact resistance at 23° C. (J/m) |
| --- | --- | --- | --- |
| Reference 1-E | 180 | 1273 | 313 |
| Sample 3-A-E | >1000 | 1337 | 303 |
| Reference 3-E | 150 | 1100 | 168 |
| Sample 5-A-E | >1000 | 1112 | 163 |
| Reference 4-E | 14 | 1629 | 150 |
| Sample 6-A-E | 66 | 1568 | 119 |

As demonstrated in Table 9, the increase in ESCR is relatively insensitive of the modality of the molecular weight distribution, and the sample compositions maintain mechanical properties similar to that of the respective reference composition. This is possible due to the selective crosslinking of the dispersed phase, maintaining the polyethylene matrix intact.

Example 6

In the next example, the impact of the reference polymer density on the mechanical properties of the polymer compositions is evaluated. Reference 3-E is a polyolefin with density of 0.95 g/cm$^3$ and Reference 4-E is a polyolefin with an initial density of 0.96 g/cm$^3$.

It is noted that the selective modification of the PVOH by the crosslinking agent keeps the mechanical properties of the polymer compositions close to their reference, with the advantage of expressive gains in ESCR for the HDPE 2 resin in Reference 3-E. In spite of the low values with the HDPE 3-based polymer compositions, the relative increase was superior to 4× the time for ESCR tests than for its pure resin. The results are presented in Table 10.

TABLE 10

Comparative results varying the density of the reference polymer.

| Samples | ASTM D-1693 ESCR (h) | ASTM D-790 Flexural modulus (MPa) | ASTM D-256 IZOD impact resistance at 23° C. (J/m) |
| --- | --- | --- | --- |
| Reference 3-E | 150 | 1100 | 168 |
| Sample 5-A-E | >1000 | 1112 | 163 |
| Reference 4-E | 14 | 1629 | 159 |
| Sample 6-A-E | 66 | 1568 | 119 |

While a number of polyolefin based compositions are discussed in the previous examples, the above approach may be applied to other polyolefins of varied density and molecular weight to produce polymer compositions exhibiting enhanced environmental stress cracking resistance properties and balanced mechanical properties.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures.

Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function,

The invention claimed is:

1. A polymer composition comprising:
   a polymer matrix comprising a polyolefin; and
   one or more polymer particles dispersed in the polymer matrix, wherein the one or more polymer particles comprise a polar polymer selectively crosslinked with a crosslinking agent, and wherein the one or more polymer particles has an average particle size of up to 200 µm;
   wherein the polymer matrix further comprises a functionalized polyolefin present in the range of 0.1 wt % to 15 wt %, based in the total mass of the polymer composition, and
   wherein the polar polymer comprises at least one functional group selected from the group consisting of hydroxyl, carboxylic acid, carboxylate, ester, ether, acetate, amide, amine, imide, imine, sulfone, phosphone and their derivatives.

2. The polymer composition of claim 1, wherein the one or more polymer particles has an average particle size of up to 50 µm.

3. The polymer composition of claim 1, wherein the polyolefin is present in a range of 99.5 wt % and 30 wt %.

4. The polymer composition of claim 1, wherein the polyolefin is present in a range of 99.9 wt % and 90 wt %.

5. The polymer composition of claim 1, wherein the polyolefin comprises one or more polymers selected from a group consisting of ethylene homopolymers, copolymers of ethylene and one or more C3-C20 alpha-olefins, propylene homopolymers, copolymers of propylene and one or more comonomers selected from ethylene or C4-C20 alpha-olefins, heterophasic propylene polymers, olefin terpolymers, and blends thereof.

6. The polymer composition of claim 1, wherein the polar polymer is selected from the group consisting of polyvinyl alcohol, ethylene vinyl alcohol copolymer, ethylene vinyl acetate copolymer and mixtures thereof.

7. The polymer composition of claim 1, wherein the crosslinking agent is selected from the group consisting of maleic anhydride, maleic acid, itaconic acid, itaconic anhydride, succinic acid, succinic anhydride, succinic aldehyde, adipic acid, adipic anhydride, phthalic anhydride, phthalic acid, glutaraldehyde, their derivatives and mixtures thereof.

8. The polymer composition of claim 1, wherein the functionalized polyolefin is a polyolefin functionalized with one or more selected from a group consisting of maleic anhydride, maleic acid, acrylic acid, methacrylic acid, itaconic acid, itaconic anhydride, methacrylate, acrylate, epoxy, silane, succinic acid, succinic anhydride, ionomers, and their derivatives.

9. The polymer composition of claim 1, wherein the polymer composition presents a Normalized Property Balance Index ($N_{PBI}$) within the range of 1.5 to 10, wherein the $N_{PBI}$ is calculated according to the formula:

$$N_{PBI} = \frac{PBI_{sample}}{PBI_{reference}},$$

where $PBI_{sample}$ is the property balance index for a sample of the polymer composition, and $PBI_{Reference}$ is the property balance index of a reference polymer composition consisting of the polyolefin; and wherein PBI is calculated according to the formula:

$$PBI = \frac{FM \times IR \times ESCR}{10^7},$$

where FM is the stiffness of the sample as determined by secant modulus of elasticity at 1% deformation according to ASTM D-790 in units of MPa, IR is the IZOD impact resistance according to ASTM D-256 in units of J/m, and ESCR is the environmental stress cracking resistance according to ASTM D-1693 in units of h.

10. The polymer composition of claim 1, wherein the polymer composition presents up to 60% increase in barrier to oxygen when compared to a reference polyolefin according to ASTM-1927.

11. The polymer composition of claim 1, wherein the polymer composition presents up to 60% increase in barrier to volatile organic compounds (VOC) when compared to a reference polyolefin.

12. A manufactured article comprising the polymer composition of claim 1.

13. A polymer composition comprising:
   a polymer matrix comprising a polyolefin;
   one or more polymer particles dispersed in the polymer matrix, the one or more polymer particles comprising a polar polymer reacted with a crosslinking agent to form a crosslinked polar polymer, wherein the crosslinking agent reacts selectively with one or more functional groups present on the polar polymer, and wherein the polar polymer is crosslinked in the presence of the polymer matrix, and
   wherein the crosslinking agent is selected from the group consisting of maleic anhydride, maleic acid, itaconic acid, itaconic anhydride, succinic acid, succinic anhydride, succinic aldehyde, adipic acid, adipic anhydride, phthalic anhydride, pthalic acid, glutaraldehyde, their derivatives and mixtures thereof.

14. A polymer composition comprising:
   a polymer matrix comprising a polyolefin; and
   one or more polymer particles dispersed in the polymer matrix, wherein the one or more polymer particles comprise a polar polymer selectively crosslinked with a crosslinking agent, and wherein the one or more polymer particles has an average particle size of up to 200 µm,
   wherein the polymer matrix further comprises a functionalized polyolefin present in the range of 0.1 wt % to 15 wt %, based in the total mass of the polymer composition, and
   wherein the polar polymer is selected from the group consisting of polyvinyl alcohol, ethylene vinyl alcohol copolymer, ethylene vinyl acetate copolymer and mixtures thereof.

* * * * *